(12) United States Patent
Fischer

(10) Patent No.: US 6,632,307 B2
(45) Date of Patent: Oct. 14, 2003

(54) TREAD BAND APPLICATOR DEVICE AND METHOD FOR APPLYING A TREAD BAND TO A TIRE BEING RETREADED

(75) Inventor: Florian Fischer, Ebersberg (DE)

(73) Assignee: A-Z Formen- und Maschinenbau GmbH (DE)

( * ) Notice: Subject to any disclaimer, the term of this patent is extended or adjusted under 35 U.S.C. 154(b) by 122 days.

(21) Appl. No.: 09/844,449

(22) Filed: Apr. 26, 2001

(65) Prior Publication Data

US 2002/0005243 A1 Jan. 17, 2002

(30) Foreign Application Priority Data

Apr. 26, 2000 (DE) .......................... 100 20 414

(51) Int. Cl.$^7$ ............................................... B29D 30/60
(52) U.S. Cl. ................... 156/96; 156/117; 156/130; 156/397
(58) Field of Search ................. 156/117, 397, 156/130, 96, 408–410, 130.3, 405.1, 406.4

(56) References Cited

U.S. PATENT DOCUMENTS

| | | | | |
|---|---|---|---|---|
| 4,551,806 A | * | 11/1985 | Storace et al. | 156/405.1 |
| 4,963,207 A | * | 10/1990 | Laurent | 156/117 |
| 5,942,059 A | * | 8/1999 | Wulker et al. | 156/117 |
| 6,372,070 B1 | * | 4/2002 | Iizuka et al. | 156/117 |

FOREIGN PATENT DOCUMENTS

| | | |
|---|---|---|
| DE | 1729555 | 3/1972 |
| DE | 4203027 A1 | 8/1993 |
| EP | 0637506 A1 | 2/1995 |
| FR | 2359700 | 2/1978 |
| JP | 2000-289122 A | * 10/2000 |

* cited by examiner

*Primary Examiner*—Geoffrey L. Knable
(74) *Attorney, Agent, or Firm*—R W Becker & Associates; R W Becker

(57) ABSTRACT

A tread band applicator device is provided for building a tread band on a tire carcass and includes a press applicator head for applying a tread band raw material mass onto the tire carcass as the tire carcass is rotated. The press applicator head is movable along the direction of the axis of rotation of the tire carcass in correspondence with the curvature of the outer surface of the tire carcass and is operable to apply the tread band raw material in a width which is less than the width of the tire carcass. The press applicator head is a component of an extruder which is mounted for movement about a plurality of axes.

22 Claims, 2 Drawing Sheets

TREAD BAND APPLICATOR DEVICE AND METHOD FOR APPLYING A TREAD BAND TO A TIRE BEING RETREADED

BACKGROUND OF THE INVENTION

The present invention relates to a tread band applicator device operable to apply a tread band raw material mass onto a carcass of a tire to form thereon a tread band and, in particular, to form a tread band on the carcass of a tire having an especially long performance life.

A conventional tread band applicator device is described in FR-OS 23 59 700. This conventional tread band applicator device comprises a forming applicator which is connected to an extruder and is operable to apply a tread band raw material mass on the tire carcass. The application of the tread band raw material mass includes deposing a predetermined excess of the material mass onto the tire carcass, whereby a rubber roller is deployed to effect the filling of inadequately filled locations on the tire carcass.

A disadvantage of the just noted conventional tread band applicator device is that a special forming applicator configured with respect to the diameter of the tire to be handled must be used so that an inventory of different forming applicators for handling tires of differing diameters must be kept on hand.

The conventional tread band applicator device described in the above-noted publication may, however, fail to reliably completely fill the relatively deeper recesses in the tire carcass so that it is necessary, prior to the tread band applying process, to perform a labor intensive preparation of the tire with a small hand extruder in order to foreclose the possibility that air pockets and inadequately filled locations will remain in the tire to such an extent that the quality requirements of the tire retreader and its customers would not be met.

Additionally, the afore-described tread band applicator device is effective in its operation only within the range of applications in which the carcass diameter does not deviate substantially from a given diameter; otherwise, the tread bands applied in an application outside of this range will be markedly thick and/or markedly thin, either of which leads to unsatisfactory results upon vulcanization of the tire.

In order that the afore-described tread band applicator device can perform in a relatively satisfactory manner, it is additionally necessary that a relatively soft rubber mixture is used to form the tread band raw material mass. In such relatively soft rubber mixtures, the portion of solid particles is reduced; the traction of the retreaded tire formed therefrom is for the most part very good while, on the other hand, the performance life of the tire is decidedly short.

It must be noted, however, that, in view of the rising quality demands of customers, tires with a high performance life are increasingly in demand. The incorporation of solid particles of various types into the rubber mixture, as well as adjustment of the rubber mixture, permits not only that the traction of the tire and its performance life be adjusted, but also permits adjustment of the accumulated drum work and the degree of heat build up in the tire during use. Thus, tires have been proposed for commercial vehicles and trucks whose performance life extends to over 800,000 kilometers, whereby correspondingly relatively hard and wear resistant tread bands are required.

A further disadvantage of conventional tread band applicator devices is that the impact of the tread strips must be renewed with higher precision. Careful follow up labor is required to achieve a relatively acceptable result. Moreover, an undesirable value of the so-called mold filling factor comes into play which leads to a correspondingly greater generation of scraps. This disadvantage should be overcome by the so-called camelback process in which a pre-prepared tread band is applied onto the tire carcass. To be sure, grinding holes occur in connection with this process which then must be filled in a labor intensive operation.

The tread band applicator device described in FR-OS 23 59 700 would not be suitable for producing those tires upon which the high quality demands noted herein are placed.

Numerous other tread band applicator devices have been proposed. EP-A1 637 506 makes note of several patent publications which set forth the state of the art of such tread band applicator devices. A tire retreading device, which operates relatively independently of the given diameter of the tire being handled, is described in DE 42 03 027 and the width of the tread band applied by this device can be adjusted to accommodate the retreading requirements.

It has been known for several years, moreover, to apply tread bands by winding them onto the tire carcass in spiral strips. This manner of applying tread bands was implemented in the 1970s, whereby, for example, DE-PS 17 29 555 describes one such exemplary application of this type. This tread band applying approach is today, however, only infrequently implemented as it cannot be ensured by this approach that air has not been trapped in the applied tread bands. At the same time, the geometry of the tread bands is relatively inexact and the production of a tread band can require up to 5 minutes.

SUMMARY OF THE INVENTION

The present invention offers a solution to the challenge of providing a tread band applicator device which is advantageous as well for applying tread bands to tires of large diameter, even if a high performance life of the tire is demanded.

In accordance with the present invention, it is particularly advantageous that the configuration of the press applicator head of the tread band applicator device of the present invention, which moves transversely over the tire carcass to apply the tread band raw material mass, permits the advantages of the known tread band applicator devices to be combined: the press applicator head, which is preferably configured as the extruder itself or as a component of the extruder, can be moved transversely across the outer surface of the tire carcass in such a manner that the tread band strips are circumferentially applied to the tire carcass in thin bands during rotation of the tire carcass. In this manner, the already applied tread band strips act as support for the newly applied tread band strips. In view of the fact that the tread band rubber mixture is relatively hard, a good driving out or expulsion of air results. It is particularly advantageous in connection with this process that the extrusion front, which is formed by the simultaneous pressure and extrusion movement of the tread band raw material mass which has just exited the extruder structure, effectively pushes away the air so that the risk of included or trapped air is foreclosed.

It is particularly advantageous if a side flank of the extruder is formed with a ball or curved shape and if this side flank of the extruder initially leans against the carcass and then, after the beginning of the application of the tread band, leans against the already applied tread band. The thickness of the tread band strips allows for very responsive and precise control of their application by these techniques, whereby, at the same time, it is possible to compensate for any out of roundness areas.

The extrusion of the tread band raw material mass is preferably performed in a manner such that a deliberate over extrusion of the tread band raw material mass is provided which is wrapped around the carcass due to the rotation of the carcass and which is beneficial for a uniform loading of the carcass with the tread band raw material mass.

In accordance with the present invention, it is particularly advantageous if the extruder is pivotable relative to four axes and, in particular, is pivotable relative to five axes. In this manner, it is possible to control the extruder to follow the desired contour of the tire without necessitating an additional capability to adjust the carcass mounting during the tread band applying process.

In accordance with a modified embodiment of the tread band applicator device of the present invention, it is provided that the extruder is configured with a special extruder outlet piece which serves as the press applicator head and is pivotable relative to four or five axes. The extruder of this embodiment of the tread band applicator device of the present invention is connected to the outlet piece via a pressurized conduit.

In accordance with a further modified embodiment of the tread band applicator device of the present invention, it is provided that the extruder is adjustably movable relative to only two or three axes while the carcass mounting as well is limited to adjustable movement relative to a maximum of two or three axes. This embodiment of the tread band applicator device of the present invention likewise permits the desired control of the profile following movement and spacing between the outer surface of the carcass and the extrusion outlet piece.

In accordance with the present invention, it is especially beneficial that the mold filling factor is particularly good. The applied tread bands can be so applied as to effectively correspond exactly to the desired profile so that no excess tread band raw material mass occurs and, consequently, the generation of elastomer scrap which must be discarded is markedly reduced. The method of applying a tread band onto a tire carcass of the present invention also includes the step of moving the press applicator head so as to vary the spacing of the press applicator head from the tire carcass as the press applicator head moves transversely across the tire carcass from an initial relatively greater spacing to a subsequent relatively lesser spacing, whereby the thickness of the tread band raw material mass applied by the press applicator head varies in correspondence with the spacing of the press applicator head from the tire carcass.

Moreover, it is additionally especially advantageous that basically no pre-preparation of a tread band is required so that the overall labor and material effort is to this extent reduced. This also allows the possibility of using high viscosity material for the tread bands such as, for example, Muni 100, which yields correspondingly particularly wear resistant tires. In this connection, it is of advantage that the use of a small nozzle with its corresponding sharp cross section reduction can be dispensed with and that a comparatively large nozzle can be used instead.

It is further provided, in accordance with the present invention, that the press applicator head extends over less than the axial width of the carcass and is mounted for movement in the axial direction. The press applicator head can travel across the so-called "raw" radius and apply a substantially hard tread band rubber mixture in a targeted manner and in a charge which corresponds to the height of the tread band. The tread band strips, which are applied in adjoining manner to one another, are so hard that they do not cause included or trapped air to adhere to them but, rather, cause such air to be pressed outwardly, whereby it can be advantageous to configure the cross section of the tread band strips generally in a trapezoidal shape with the longer side thereof turned toward the carcass. Due to the pressure of the pressure applying applicator device or of the extruder, each tread band strip is not only pressed against the respective adjoining tread band strip which has already been applied into its position in conjunction with the rotation of the carcass but is also pressed down to the raw radius of the carcass.

The tread band applicator device of the present invention unexpectedly improves the filling in of notches and holes in spite of the use of hard rubber mixtures or rubber mixtures having a considerable solids percentage; evidently, the tread band strip applied by the tread band applicator device of the present invention, which is, for example, one-tenth the width of a tread band, can better follow the outer surface contour and can be pressed thereonto more effectively.

A particularly good advantage of the tread band applicator device of the present invention is that it leads to the result that pressure is exerted only over a small portion of the full width of the carcass. If the same force is brought to bear, then, for example, a ten times larger surface pressure results if the width of the tread band strip is one-tenth of the full axial width of the carcass. At the same time, the carcass is not unreliably distorted and the turning resistance of the press applicator head, which needs to be overcome by the rotational drive of the carcass, is, in any event, not greater than that to be overcome with a conventional press applicator head.

It is to be understood that, in addition to the width of the tread band strips, the type and configuration of the press applicator head or the extruder of the tread band applicator device of the present invention can be accommodated to the tire building requirements. For example, in a modified embodiment of the tread band applicator device of the present invention, two press applicator heads can be moved in opposite directions from one another from a starting position at the axial middle of the carcass in order to thereby build the tread bands toward both sides of the tire. A configuration such as this permits the building of a large tire such as, for example, a tire for a commercial truck, in a markedly short time such as, for example, in 90 seconds.

A second particularly beneficial advantage of the tread band applicator device of the present invention comes from the combination of the tread band strips applied by the tread band applicator device of the present invention with a binder rubber layer. It is provided, in accordance with the present invention, that, a binder rubber layer is applied to the carcass before the application of the tread band strips and after the cushion-to-casing process such as shown, for example, in EP-A1-637,506. A binder rubber layer of this type itself fills in notches or grooves in the carcass. At the same time, the side end regions can be thickened such as can be seen, for example, in FIG. 9 of the just-noted publication. In both cases, the small area increased pressure which results from the tread band application method of the present invention not only improves the pressing of the tread bands onto the binder rubber layer, which thereby improves the connection therebetween, but it also causes a deepening or thickening, in a follow on manner, of the connection between the binder rubber layer and the carcass.

A further particularly beneficial advantage of the tread band applicator device of the present invention is that the tread band applying process can be conducted at comparatively lower temperatures so that it need not be a concern that the binder rubber layer will be prematurely vulcanized before the actual vulcanization of the uncured retreaded tire.

BRIEF DESCRIPTION OF THE DRAWINGS

This object, and other objects and advantages of the present invention, will appear more clearly from the following specification in conjunction with the accompanying schematic drawings, in which.

DETAILED DESCRIPTION OF THE PREFERRED EMBODIMENT

Figure 1:
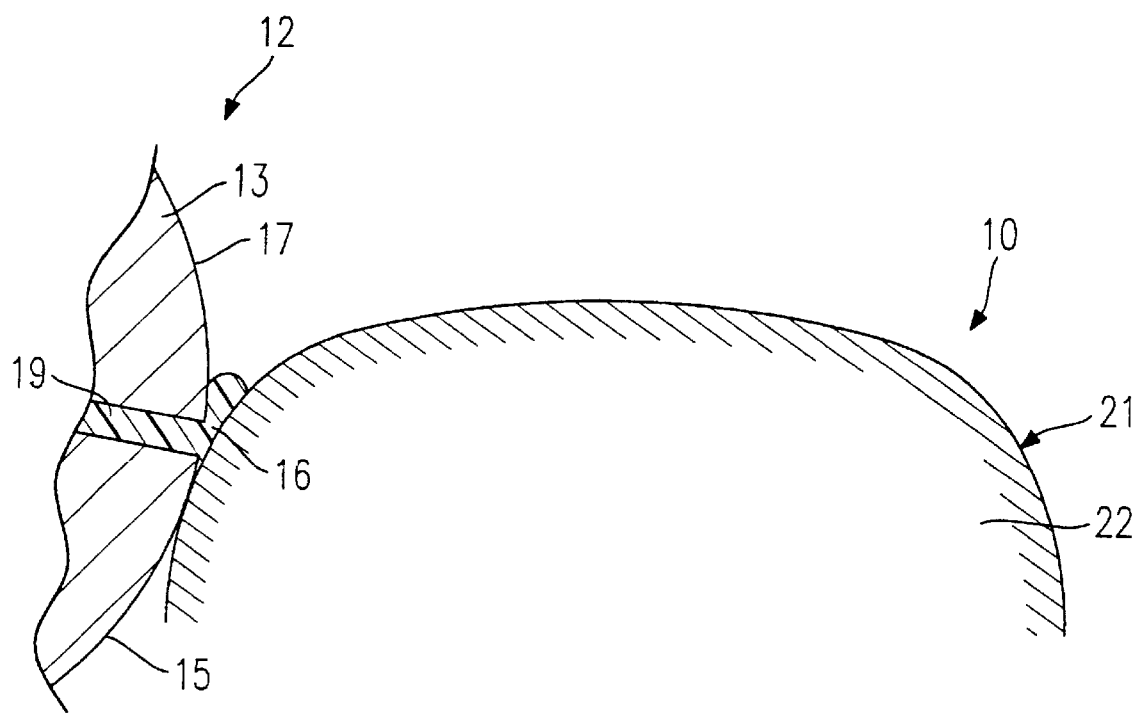
FIG. 1 is a schematic view of one embodiment of the tread band applicator device of the present invention at the operational stage at which the application of a tread band onto a carcass begins.

FIG. 1 shows one embodiment of the tread band applicator device of the present invention in the form of a tire tread applying device 10 having a press applicator head 12 configured as an extruder 13 or as a portion of the extruder, the extruder being mounted for movement about five axes. The extruder includes a first side flank 15 and a second side flank 17 between which extends an extrusion nozzle 19. The extruder 13, in the operational stage shown in FIG. 1, is disposed such that its first side flank 15 is disposed on a carcass 22 which is rotatably supported at a support which lies outside of the view shown in FIG. 1.

The carcass 22 includes a carcass outer surface 21 which extends, in a conventional manner, in a curved profile across the axial width of the tire. The carcass outer surface 21 is formed into its curved profile by grinding off the tread on the carcass of the tire casing, which then leaves the tire casing with an already roughened surface ready to receive a new tread thereon.

The extrusion nozzle 19 extrudes a tread band raw material mass 16 in a manner such that the tread band raw material mass 16 extends toroidally to the middle or equator of the carcass 22. The tread band raw material mass 16 is precluded from extending axially beyond the first side flank 15 due to the fact that the first side flank 15 is disposed on the carcass 22. The tread band raw material mass 16 is applied onto the carcass by extrusion of the tread band raw material mass as the carcass is rotated, whereby the tread band raw material mass applied onto the carcass forms a tread band strip 18 as seen in FIG. 2.

Figure 2:
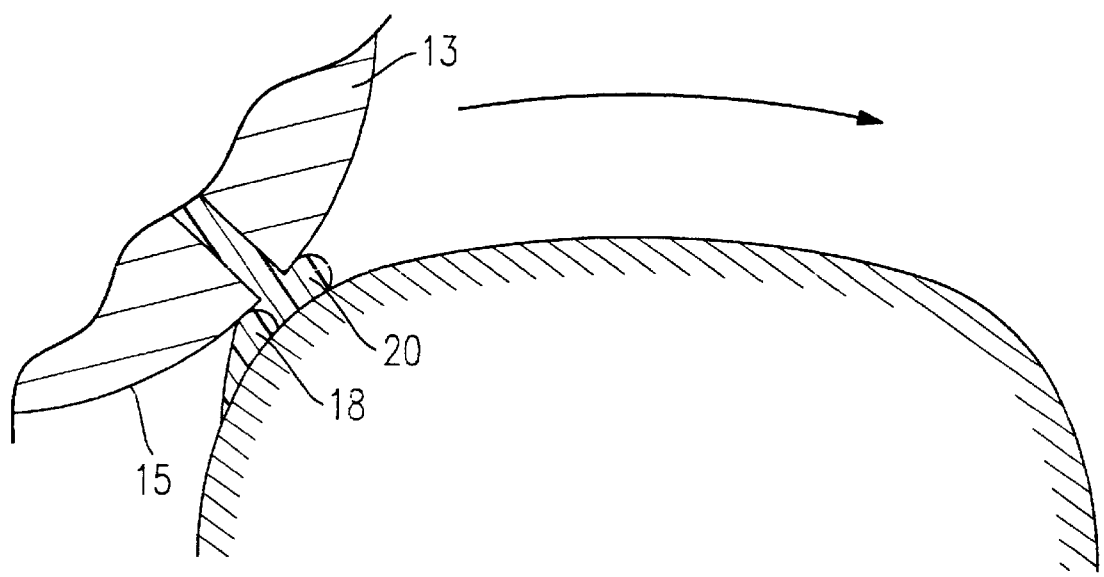
FIG. 2 is a schematic view of the one embodiment of the tread band applicator device of the present invention shown in FIG. 1 at an operational stage shortly after the application of the tread band onto the carcass has begun.

As seen in FIG. 2, a further tread band strip 20 is subsequently built up onto the carcass extending from the tread band strip 18. In this further tread band build up process, the extruder 13 is in a position in which it has been tilted, raised and offset to the side relative to its position as shown in FIG. 1, whereby, in the position of the extruder 13 shown in FIG. 2, the first side flank 15 is disposed on the outer surface of the tread band strip 18 and thus seals off the flow of tread band raw material mass in that direction. The further tread band strip 20 is built into a toroidal shape and seamlessly transitions into the tread band strip 18. The additional tread band is built up over the entire axial width of the carcass 22 by rotation of the carcass 22 until the second side flank 17 reaches the extreme right hand side, as shown in FIG. 2, of the carcass.

The carcass 22 has preferably been pre-prepared with a binder rubber layer (not shown) prior to the build up of the tread band raw material mass 16 thereon.

Figure 3:
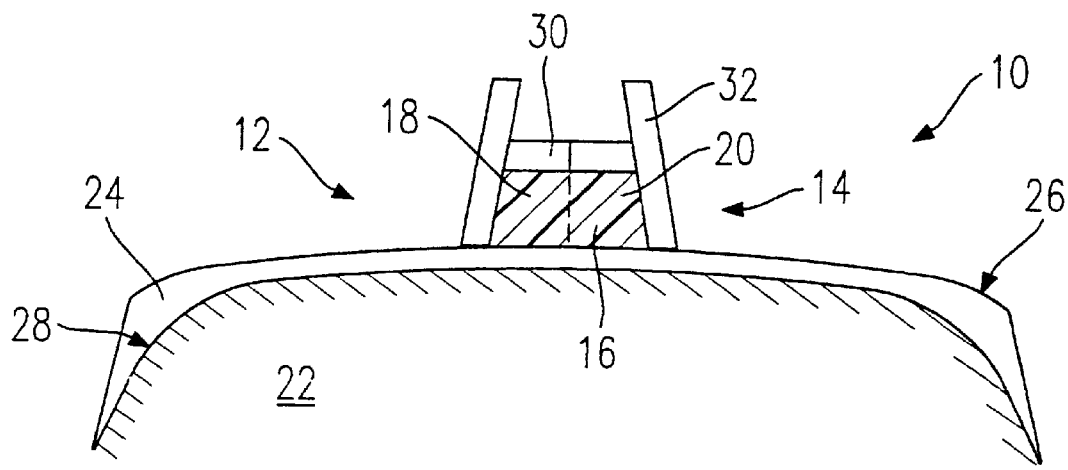
FIG. 3 is a schematic view of another embodiment of the tread band applicator device of the present invention at the operational stage at which the application of a tread band onto a carcass begins.

FIG. 3 shows another embodiment of the tread band applicator device of the present invention in the form of a tire tread applying device 10 having a pair of press applicator heads 12 and 14 via which the tread band raw material mass 16 is press applied onto the schematically illustrated carcass 22 to form a tread band 20 thereon. The carcass 22 has been pre-prepared with a binder rubber layer 24 which preferably has an increased binding strength as it approaches the side flanks, whereby the outer surface 26 of the binder rubber layer 24 is slightly less curved than the uncured radius 28 of the carcass 22.

Each press applicator head 12 and 14 includes a back wall 30 and a side wall 32. The combination of the back walls 30 and the side walls 32 encloses the tread band strips 18 and 20 extending therebetween and thereby presses these tread band strips against one another as well as pressing the tread band strips onto the binder rubber layer 24 with a pressure corresponding to the tire building requirements. The pressure of the tread band strips against one another is promoted by a predetermined angled disposition of the side walls 32 so that the tread band strips 18 and 20 assume a slight trapezoidal shape, the longer side of which is the side turned toward the carcass 22. The inclinations of the side walls 32 have been exaggerated in FIG. 2 solely to clearly illustrate this characteristic.

Figure 4:
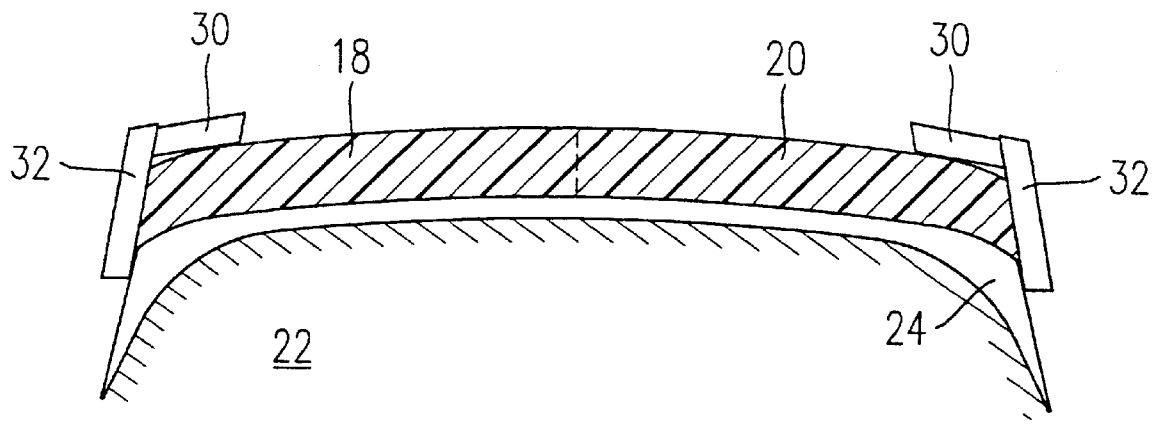
FIG. 4 is a schematic view of the embodiment of the tread band applicator device of the present invention shown in FIG. 3 at the operational stage at which the application of the tread band onto the carcass is completed.

A comparison of the operational stages respectively shown in FIGS. 3 and 4 shows that tread band strips are progressively symmetrically built onto the carcass in opposed directions from the middle or equator of the carcass toward its side flanks as the carcass 22 is rotated. FIG. 4 shows the operational stage at which the build up of the tread band strips has been completed such that the tread band strips extend over the entire axial width of the tire casing and exhibit a uniform strength, whereby the tread band strips transition into one another without any air being trapped therebetween.

In order to improve the tire tread build up in the region of the flanks, the side wall 32 is mounted for movement in response to a pushing force thereagainst, as is shown in both the position of the side wall in FIG. 3 and the position of the side wall in FIG. 4.

It is to be understood that, in one variation of the tread band applicator device of the present invention, an individual press applicator head 12 having two side walls 32 can be provided which is operable to build up the tread band strips onto the carcass in a direction, for example, from the left hand side of the carcass to the right hand side of the carcass.

The movements of the press applicator heads 12 and 14 are controlled by a control device (not shown), whereby the given diameter of the tire dictates the path of movement and an optical data capture device such as a camera monitors the quality of the build up.

The specification incorporates by reference the disclosure of German priority document 100 20 414.7 of Apr. 26, 2000.

The present invention is, of course, in no way restricted to the specific disclosure of the specification and drawings, but also encompasses any modifications within the scope of the appended claims.

What I claim is:

1. A In a tread band applicator device for building a tread band on a tire carcass, the improvement comprising:

a press applicator head for applying a tread band raw material mass onto the tire carcass as the tire carcass is rotated, the press applicator head being movable along the direction of the axis of rotation of the tire carcass in correspondence with the curvature of the outer surface of the tire carcass and being operable to apply the tread band raw material in a width which is less than the width of the tire carcass, the press applicator head including an opening through which the tread band raw material is extruded and a side flank extending axially to one side of the opening, as viewed relative to the axis of rotation of the tire carcass, and the press applicator head is operable to apply the tread band raw material onto the tire carcass by extrusion of the tread band raw material through the opening as the tire carcass is rotated, wherein the extruded tread band raw material forms a tread strip extending circumferentially around the tire carcass, and the press applicator head being displaceable axially to successive positions transversely across the width of the tire carcass for extruding at each successive position another tread strip in axially abutting contact with the respective just-applied tread strip and the side flank of the press applicator head being disposed in sealing manner on the outer surface of each respective just-applied tread strip as the tread band raw material is extruded to form the next successive tread strip such that the extruded tread band raw material is sealed off from flow in the direction of the respective just-applied tread strip on which the side flank is disposed.

2. A tread band applicator device according to claim 1, wherein the press applicator head is a component of an extruder which is mounted for movement about a plurality of axes.

3. A tread band applicator device according to claim 1, wherein the press applicator head is a component of an extruder and the press applicator head forms both an extrusion nozzle having an outlet which is the opening of the press applicator head and a side flank extending axially to one side of the extrusion nozzle, relative to the axis of rotation, the side flank being configured for disposition on the outer surface of the tire carcass.

4. A tread band applicator device according to claim 3, wherein the press applicator head includes a pair of side flanks each having a rounded off surface.

5. A tread band applicator device according to claim 4, wherein the press applicator head includes a pair of side flanks, each extending axially to one respective side of the extrusion nozzle, relative to the axis of rotation, and each of the side flanks of the press applicator head is configured for disposition on the tire carcass and on a tread band strip previously applied onto the tire carcass.

6. A tread band applicator device according to claim 3, wherein the press applicator head includes a second flank and the side flanks and the extrusion nozzle are configured to operate in a cooperative manner with one another as the press applicator head.

7. A tread band applicator device according to claim 6, wherein the press applicator head includes a pair of side flanks each extending axially to one respective side of the extrusion nozzle, relative to the axis of rotation, at an equal spacing therefrom such that the pair of side flanks are configured symmetrically with respect to the press applicator head, each of the side flanks of the press applicator head is configured for disposition on the tire carcass and on a tread band strip previously applied onto the tire carcass, and each of the side flanks has a convex curvature.

8. A tread band applicator device according to claim 1, wherein the tire carcass is rotatably driven by a rotation drive device and the press applicator head is movable at an angled disposition transverse to the outer surface of the tire carcass at a spacing thereabove.

9. A tread band applicator device according to claim 1, wherein the press applicator head is operable to apply the tread band raw material mass onto the tire carcass at a thickness corresponding to the thickness of the tread band formed by the applied tread band raw material mass after curing.

10. A tread band applicator device according to claim 1, wherein the press applicator head is movable in a contour following manner over the respective one of the outer surface of the tire carcass and the already applied tread band onto which the press applicator head is applying the tread band raw material mass.

11. A tread band applicator device according to claim 1, wherein the press applicator head is operable to apply the tread band raw material mass having an additive component.

12. A tread band applicator device according to claim 11, wherein the press applicator head is operable to apply the tread band raw material mass having an additive component comprising between 10 to 50% of the tread band raw material mass.

13. A tread band applicator device according to claim 1, wherein the width of the press applicator head is less than one-third of the axial width of the tire carcass.

14. A tread band applicator device according to claim 13, wherein the width of the press applicator head is less than one-tenth of the axial width of the tire carcass.

15. A tread band applicator device according to claim 1, and further comprising a second press applicator head, the pair of press applicator heads being movable in a symmetrical manner relative to one another and relative to the tire carcass.

16. A tread band applicator device according to claim 1, and further comprising a control device operably connected to the press applicator head for reliably repeatably controlling the movement of the press applicator head across a tire carcass at a spacing thereabove for effecting the build up of tread bands onto the tire carcass.

17. A tread band applicator device according to claim 1, and further comprising an arrangement of a control device operably connected to the press applicator head for reliably repeatably controlling the movement of the press applicator head across a tire carcass at a spacing thereabove for effecting the build up of tread bands onto the tire carcass and an optical data capture device operably connected to the control device, whereby the progression of the application of the tread bands by the press applicator head is monitored and controlled.

18. A method of applying a tread band onto a tire carcass, comprising:

providing a press applicator head operable to apply a tread band raw material mass onto the tire carcass which is rotatably supported for rotation about an axis of rotation during the application of a tread band thereon, the press applicator head including an opening and a side flank extending axially to one side of the opening, as viewed relative to the axis of rotation of the tire carcass; and applying the tread band raw material mass onto the tire carcass by moving the press applicator head transversely across the tire carcass in a manner such that the width of the respective applied tread band raw material mass applied by the press applicator head is always less than the full axial width of the tire carcass, wherein the step of applying the tread band raw material mass onto the tire carcass includes extruding the tread band raw material mass through the opening in the press applicator head as the tire carcass is rotated, wherein the extruded tread band raw material forms a tread strip extending circumferentially around the tire carcass, and displacing the press applicator head axially to extrude successive axially abutting tread strips on the tire carcass with the side flank of the press applicator head being successively disposed in sealing manner on the outer surface of each respective newly formed axially abutting tread strip as the tread band raw material is extruded to form the next successive tread strip such that the extruded tread band raw material is sealed off from flow in the direction of the respective axially abutting tread strip on which the side flank is disposed.

19. A method of applying a tread band onto a tire carcass according to claim 18, wherein the step of moving the press applicator head includes varying the spacing of the press applicator head from the tire carcass as the press applicator head moves transversely across the tire carcass from an initial relatively greater spacing to a subsequent relatively lesser spacing, whereby the thickness of the tread band raw material mass applied by the press applicator head varies in correspondence with the spacing of the press applicator head from the tire carcass.

20. A method of applying a tread band onto a tire carcass according to claim 18, wherein the step of applying the tread band raw material mass includes applying at least one location of the uncured tread band a greater amount of the tread band raw material mass than a predetermined uncured thickness of the uncured tread band.

21. A method of applying a tread band onto a tire carcass according to claim 18, wherein the tire carcass is rotated less than 100 times during the application of the tread band raw material mass thereon to form a tread band and the instantaneous width of the applied tread band raw material mass corresponds to approximately $\frac{1}{10}$ to $\frac{1}{30}$ the full axial width of a tread band.

22. A method of applying a tread band onto a tire carcass according to claim 21, wherein the tire carcass is rotated less than 20 times during the application of the tread band raw material mass thereon to form a tread band.

* * * * *